(12) United States Patent
Frisch

(10) Patent No.: US 6,350,718 B1
(45) Date of Patent: Feb. 26, 2002

(54) SEED TREATMENT FORMULATIONS CONTAINING PHYTOBLAND SYSTEMS

(75) Inventor: Paul Douglas Frisch, Kingwood, TX (US)

(73) Assignee: ExxonMobil Chemical Patents Inc., Houston, TX (US)

(*) Notice: Subject to any disclaimer, the term of this patent is extended or adjusted under 35 U.S.C. 154(b) by 0 days.

(21) Appl. No.: 09/417,819

(22) Filed: Oct. 14, 1999

Related U.S. Application Data

(60) Provisional application No. 60/104,291, filed on Oct. 14, 1998.

(51) Int. Cl.⁷ .......................... A01N 25/26; A01N 3/02; A01N 63/00
(52) U.S. Cl. .................. 504/100; 504/116; 504/118
(58) Field of Search .................. 504/117, 118, 504/116, 100

(56) References Cited

U.S. PATENT DOCUMENTS

| | | | | |
|---|---|---|---|---|
| 4,448,796 A | * | 5/1984 | Wieser et al. | 427/4 |
| 5,130,171 A | * | 7/1992 | Prud'Humme et al. | 427/213.36 |
| 5,415,672 A | * | 5/1995 | Fahey et al. | 47/57.6 |
| 5,849,320 A | | 12/1998 | Turnblad et al. | 424/410 |
| 5,950,360 A | | 9/1999 | Heinrich et al. | |

FOREIGN PATENT DOCUMENTS

| | | | | |
|---|---|---|---|---|
| EP | 0839447 | | 5/1998 | A01N/25/02 |
| WO | 9531889 | | 11/1995 | A01C/1/06 |

* cited by examiner

*Primary Examiner*—Alton Pryor
(74) *Attorney, Agent, or Firm*—Louis N. Moreno

(57) ABSTRACT

The invention relates to organic solvents that may be used in seed treatment formulations to increase the viability of seeds in the field.

17 Claims, No Drawings

SEED TREATMENT FORMULATIONS CONTAINING PHYTOBLAND SYSTEMS

CROSS-REFERENCE TO RELATED APPLICATIONS

The present application claims the benefit of Priority of U.S. Provisional Application No. 60/104,291, filed Oct. 14, 1998.

FIELD OF THE INVENTION

The invention is directed to a method of treating seeds using non-aqueous solvents and to the formulations used in the treatment.

BACKGROUND OF THE INVENTION

Seed treatment is a growing niche within the general area of crop protection. Two main factors have contributed to this. First, the technology of building crop protection and/or specific attributes into the genetic makeup of the plant has led to a significant increase in the cost of the seed. Second, seed exposure has increased because it is being planted earlier into cold, often hostile, no-till soils that provide a refuge for soil-borne diseases and insects.

It is generally known to coat seeds for various purposes, including seed identification, increasing the storage life of the seed, aiding in seed delivery to the field, increasing the viability of the seed and/or the resultant plant in the field (e.g., "weed and feed" scenarios), and various other purposes. The coatings will include, for instance, fungicides, insecticides, growth hormones, and other seed treating ingredients. The recent development of transgenic crops has resulted in an increased focus on seed treatment, because of the increased value of such genetically-altered seeds.

Seed treatments are traditionally applied as aqueous dispersions or water-based flowable formulations of the active ingredients. However, aqueous treatment methods have several disadvantages. Among these are: (1) not all seed protectant chemicals are soluble and/or stable in water, thus limiting the type of treatments available; (2) water soluble protectants rapidly leach off and away from the seed, thus diminishing effectiveness of the treatment; (3) aqueous dispersions do not cover the seed uniformly and can be physically removed by abrasion and attrition; and (4) a drying step is required to prevent premature germination due to the presence of water. Historically, alternatives to aqueous-based treatment methods have been disfavored because alternative solvents, mainly organic solvents, were believed to be toxic toward seeds (phytotoxic).

There are reports in the literature that the OSIT method (Organic Solvent Infusion Technique) may be useful in the germination of hard coated seeds. In this method, the seed is soaked in the solvent for a fixed amount of time. The solvents are generally highly volatile solvents such as xylene, acetone, methylene chloride, and the like, which have boiling points between about 40 and 150° C. This technique has been studied in the context of translocation experiments, but has yet to be proven successful and is not commercially viable using typical commercial equipment.

In U.S. Pat. No. 5,849,320, an insecticidal coating for a seed is described comprising polymer binders. The polymer serves as a matrix for the insecticide and is intended to remain on the seed as a coating. The problem solved by this patent is described therein as the "phototoxic effect of the insecticide on the seed."

Accordingly, there still remains a need for a generalized, commercially viable method of delivering all sorts of seed treatments, that will solve the aforementioned drawbacks of aqueous treatment methods while having minimal or no negative effects on the seed.

SUMMARY OF THE INVENTION

The present inventor has surprisingly found that certain non-aqueous solvents for seed coating display minimal or no phytotoxic effects toward seeds (i.e., the formulations will be "phytobland"). Seeds such as corn, cotton, wheat, soybean and rice, among others, may be treated with certain non-aqueous solvents, such as hydrocarbon solvents (e.g., normal paraffinic, isoparaffinic, dearomatized mixed aliphatics and aromatics) and heteroatom-substituted hydrocarbon solvents (e.g., aliphatic esters), with little or no negative effects seen from the use of non-aqueous solvents. In certain cases the solvent alone appears to enhance germination over untreated seeds. The present invention allows for the delivery of seed treatment agents, such as protectant chemicals (fungicides, insecticides, growth hormones, and the like) which are more readily soluble in organic solvents, provides for more uniform coverage of the seeds, less likelihood that the treatment agent will leach out from the seed, thus providing for longer protection and often the use of less active ingredient. Furthermore, with the use of non-aqueous solvents, no separate drying step is needed. The preferred solvents used according to the present invention have boiling points above 150° C. and more preferably from about 160 to 280° C.

As used herein, the term "seed treatment agents" (or "seed-treating agents") will refer to the solute which is dissolved by the non-aqueous solvent and coated on the seed. Seed treatment agents other than those known in the art as "protectants" may also be incorporated and coated on the seed using the non-aqueous solvents according to the present invention. Such ingredients, generally considered to be biologically inert, include but are not limited to colorants to aid in seed identification, dust control agents, flow aids to aid in seed delivery, and the like. These seed treatment agents will be referred to herein generally as "inert ingredients". The term "active ingredient" as used herein will refer to those seed treatment agents generally considered to be biologically active, such as the protectants listed above. Furthermore, as used herein, the term "solvent" refers to that category of chemicals which are liquid under ambient conditions and provide the specific function of solvating a substance and then ultimately evaporating. The term "fluid" is used interchangeable with "solvent" below.

Another unexpected finding of the present inventors is that non-aqueous solvent formulations can provide for systemic treatment of the seed, since the waxy seed coating is more readily penetrated by such solvents than water.

A further surprising discovery is that non-aqueous solvents have been found to improve germination of hard coated seeds.

Yet another advantage of the present invention is that it allows the use of common commercial treatment equipment while affording superior results.

Thus, it is an object of the present invention to provide for a non-aqueous solvent system for seed treatment methods.

It is a further object of the invention to improve seed performance by providing for a wider variety of active and inert ingredients to be coated onto the seed.

Yet another object is to provide for systemic treatment of seed by providing a delivery system that is more readily translocated through the seed coat.

Still another object is to provide a method wherein less active ingredient is required in the formulation and/or fewer applications of the formulation onto the seed is required.

Yet still another object of the invention is to provide a method of seed treatment, and formulation used therein, providing for increased level of protection for seeds planted under reduced or conservation tillage.

These and other objects, features, and advantages of the present invention will become apparent as reference is made to the following detailed description of the preferred embodiments, specific-examples, and the attached claims.

DETAILED DESCRIPTION OF THE INVENTION

According to the present invention, a seed is contacted with a composition comprising an organic solvent and the solvent is allowed to evaporate. The composition that is allowed to contact the seed may comprise one or more seed treatment agents, as described further below, but a surprising discovery is that merely contacting the seed with the non-aqueous solvent, and then allowing the solvent to evaporate, is beneficial to certain seeds.

In a more preferred embodiment, the seed is coated with one or more desired seed-treating agents by the steps of: (1) selecting the appropriate non-aqueous solvent; (2) preparing a seed-treating composition by dissolving an effective amount of the desired seed-treating agent(s) in the solvent or solvent system (in the case where more than one solvent is selected); (3) contacting the seed with the seed-treating composition; and (4) allowing the solvent(s) to evaporate. This method is preferably used to provide a seed c more desired seed-treating agents, for translocation of a seed-treating agent into the seed, or both.

One of ordinary skill in the art, in possession of the present disclosure, will recognize that the choice of solvent and seed-treating agent will depend on various factors, such as the specific seed to be so-treated and the environment into which the seed will be sown, and can select the appropriate solvent or mixed solvent system and an effective amount of the seed-treating agent without undue experimentation. As used herein the term "effective amount" means an amount of the seed treatment agent effective to accomplish its intended purpose.

The solvents according to the present invention are non-aqueous solvents, more preferably hydrocarbon solvents, oxygenated hydrocarbon solvents, and nitrogen-containing hydrocarbon solvent. Even more preferable are the non-aqueous solvents characterized by having boiling points above 150° C. and still more preferably having boiling points between 160 and 280° C.

The more preferred hydrocarbon solvents are normal paraffinic, isoparaffinic, dearomatized mixed aliphatic, and aromatic hydrocarbon solvents. Normal paraffins are linear alkanes, having the general formula $C_nH_{2n+2}$, where n typically ranges from 8 to 22. Isoparaffinic solvents are branched alkanes having at least one tertiary or quaternary carbon and having a carbon range similar to the normal paraffins. The most preferred "dearomatized mixed aliphatic" solvents are dearomatized mixed aliphatic solvents containing linear, branched, and cyclic paraffins which have aromatics removed. The most preferred aromatic solvents contain a mixture of only aromatic compounds, particularly $C_9$–$C_{13}$ alkyl benzene and alkyl naphthalene-type compounds. The most preferred oxygenated hydrocarbon solvents are alkyl acetate esters containing a mixture of acetic acid esters of branched oxo-alcohols, even more preferably wherein the alkyl group ranges from $C_6$–$C_{11}$. Other preferred oxygenated hydrocarbon solvents include aliphatic esters (branched or unbranched), γ-butyrolactone, cyclohexanone, and the like. Mixtures of hydrocarbon and/or oxygenated hydrocarbon solvents are also a preferred solvent. Preferred nitrogen-containing compounds include N-methylpyrrolidone.

In the preferred method according to the present invention, seeds are wetted, not soaked, with the organic solvent, as described in greater detail below. The solvent may further have dissolved therein as a solute one or more seed treatment agents, preferably agents useful for seed identification, increasing the storage life of the seed, aiding in seed delivery to the field, to increase the viability of the seed and/or the resultant plant in the field. Numerous other purposes for seed treatment are per se known in the art.

The seed treatment agent may be applied to the seed in neat solvent, or the solvent may also contain additives. Preferred additives include a surfactant package, such as an emulsifier. A surfactant package is particularly useful when the composition comprising one or more seed treatment agents and a non-aqueous solvent is to be further diluted for final application to the seed. One of ordinary skill in the art, in possession of the present disclosure, can readily determine the appropriate surfactant package.

In a still more preferred embodiment, an emulsifiable concentrate (EC) is prepared comprising the seed treatment agent, the non-aqueous solvent or solvent system, and an emulsifier, optionally with other surfactants. This emulsifiable concentrate is then diluted to the appropriate treatment rate of the active ingredient by diluting the composition with water. The seed is contacted with the resultant emulsion. In yet another preferred embodiment, the seeds are wetted, not soaked, with a solution comprising at least one active ingredient, at least one non-aqueous solvent, and a surfactant package. The non-aqueous solvent is preferably a hydrocarbon or oxygenated hydrocarbon fluid having a boiling point above 150° C. and more preferably between 160 and 280° C.

The following experiments are intended to provide a detailed description of some preferred embodiments, and not to be limiting. It will be recognized by those of skill in the art that the present invention may be practiced otherwise than as specifically set forth below.

EXPERIMENTAL

In the experiments described below, seeds were treated with solvent using a laboratory scale version of a commercially used treater (Hege Model 11 Treater, available from Hege Equipment Inc., Colwich, Kan.). In this treatment method, 250–500 g. of seed, depending on seed size, is spun in a circular bowl at a high rate of speed. The treatment chemical, in this case the organic solvent, is added slowly via pipette at the top center of the bowl as it spins. In this manner the seeds are wetted, not soaked. The amount of solvent added varies with the solvent used and/or the seed used, and is set forth as "fl. oz./cwt" in the tables and examples used herein (fl. oz./cwt refers to the treatment rate in units of fluid ounces of treatment formulation—in the cases below, the neat solvent—per hundred pounds of seed). Experiments have shown that this technique provides a uniform coating of the treatment chemical to the seed. The seed is then packaged in a paper sack and stored at room temperature until germination tests are done. This confirms that seed treated according to the present invention have a commercially viable shelf life.

The following experiments were conducted in order to demonstrate the beneficial effects afforded by the present invention. The methodology used is the Standard Paper Towel Test according to the "Rules for Testing Seeds", published by the Association of Official Seed Analysts (AOSA), 1998.

Brown, unbleached paper towels are used to conduct the test. Fifty seeds are placed on two moistened towels and are covered with another towel, or two towels in the case of large seeds. The towels are rolled, secured with a rubber band and placed in a rack. These racks are placed in germination chambers that are held at a temperature specified by AOSA rules. After three or four days time ("3 DAT" or "4 DAT"), the towels are unrolled and inspected for properly germinating seed, as determined by germination protocol per AOSA rules. The towels are then remoistened, rerolled and sent back to the germinator. After seven days ("7 DAT"), the towels are counted for a second time. Each fluid/seed combination was done four times and an average was taken of the results for each seed/fluid combination.

This test is conducted under the most favorable conditions for each type of seed. Corn (*Zea mays*) and soybean (*Glycine max.*) were treated at 25° C., cotton (*Gossypium spp.*) at 20° C. for 16 hrs and 30° C. for 8 hrs, and wheat (*Triticum aestivum*) at 20° C. 50 seeds per test were done in quadruplicate; the results reported herein are the average results of the four tests. The first count, 3 or 4 days after treatment ("3 DAT" or "4 DAT", respectively), reveals the speed of germination and the second count, 7 days after treatment ("7 DAT" in the tables), the maximum germination of the sample. The latter count is indicative of phytotoxicity of the fluid toward the seed, from which the seed cannot recover. The results are reported in the accompanying Tables 2–6.

Table 1 sets forth the solvent used. The boiling range is determined by ASTM D86. All of the solvents specified are available from Exxon Chemical Company, a Division of Exxon Corporation. Aromatic 150 (available as Solvesso® 150 outside of the United States) is a mixture of $C_9$–$C_{11}$ alkyl benzene-type aromatic compounds with an average C10 carbon number, containing 8–10% naphthalene. Aromatic 200 (available as Solvesso® 200 outside of the United States) is a mixture of $C_{10}$–$C_{13}$ alkyl naphthalene-type aromatic compounds with an average $C_{11}$ carbon number. "Acetate ester" are alkyl acetate esters containing a mixture of acetic acid esters of oxo-alcohols. Exxate® 700, a solvent containing acetic acid esters of a mixture of branched oxo-alcohols having a carbon range of $C_6$–$C_8$, with an average of $C_7$. Exxate® 1000 is a solvent containing acetic acid ester of a mixture of branched oxo-alcohols having a carbon range of $C_9$–$C_{11}$, with an average of $C_{10}$.

TABLE 1

Key Physical Properties of Solvents Used

| Type | Solvent | Carbon Range | Boiling Range |
|---|---|---|---|
| Normal Paraffin | Norpar ® 12 | 11–12 | 189–219° C. |
| Normal Paraffin | Norpar ® 15 | 14–16 | 249–274 |
| Iso-paraffin | Isopar ® G | 9–11 | 161–176 |
| Iso-paraffin | Isopar ® L | 11–12 | 188–207 |
| Iso-paraffin | Isopar ® M | 12–15 | 223–254 |
| Mixed aliphatic | Exxsol ® D80 | 12–14 | 208–234 |
| Mixed aliphatic | Exxsol ® D110 | 14–16 | 250–268 |
| Mixed aliphatic | Exxsol ® D130 | 16–19 | 282–312 |
| Aromatic | Aromatic 150 | 9–11 | 184–204 |
| Aromatic | Aromatic 200 | 10–13 | 232–277 |
| Acetate ester | Exxate ® 700 | 6–8* | 176–200 |
| Acetate ester | Exxate ® 1000 | 9–11* | 220–250 |

*Average carbon number of alcohol portion of acetate ester

The results for the germination of wheat, corn, cotton, and soybean seeds are shown in Tables 2–5, respectively, on the following pages, for the various solvents used. In the Tables 2–5, "UTC" represents the untreated control seed, "DAT" means "days after treatment", "Rate, %" means the percentage of seed which germinated normally. The treatment rates are shown at the bottom of each table. For instance, for wheat (Table 2), "1×" means 16 fl. oz./cwt for each solvent used, "½×" means 8 fl. oz./cwt. for each solvent used. These treatment rates are typical rates for fully formulated aqueous dispersions and represent a high dosage of solvent.

TABLE 2

Wheat Seed Germination Data

| Solvent | Rate* | Control | 3 DAT | 7 DAT |
|---|---|---|---|---|
| UTC | — | 1 | 58.0 | 92.0 |
|  | — | 2 | 68.5 | 94.0 |
|  | — | 3 | 98.0 | 98.5 |
| Norpar ® 12 | 1/2x | 1 | 48.0 | 87.5 |
|  | 1x | 1 | 20.0 | 62.5 |
| Norpar ® 15 | 1/2x | 1 | 2.5 | 19.5 |
|  | 1x | 1 | 0.0 | 3.5 |
| Isopar ® G | 1/2x | 1 | 51.5 | 93.0 |
|  | 1x | 1 | 51.0 | 92.0 |
| Isopar ® L | 1/2x | 2 | 43.0 | 74.5 |
|  | 1x | 2 | 45.0 | 80.5 |
| Isopar ® M | 1/2x | 1 | 21.0 | 72.0 |
|  | 1x | 1 | 6.5 | 50.0 |
| Exxsol ® D80 | 1/2x | 2 | 15.0 | 52.5 |
|  | 1x | 2 | 18.0 | 68.0 |
| Exxsol ® D110 | 1/2x | 2 | 7.0 | 46.5 |
|  | 1x | 2 | 4.0 | 27.5 |
| Exxsol ® D130 | 1/2x | 2 | 9.0 | 54.5 |
|  | 1x | 2 | 0.0 | 10.0 |
| Aromatic 150 | 1/2x | 3 | 71.0 | 91.0 |
|  | 1x | 3 | 25.0 | 69.5 |
| Aromatic 200 | 1/2x | 3 | 4.0 | 32.5 |
|  | 1x | 3 | 0.0 | 0.5 |
| Exxate ® 700 | 1/2x | 3 | 75.5 | 87.5 |
|  | 1x | 3 | 63.5 | 85.0 |
| Exxate ® 1000 | 1/2x | 3 | 9.0 | 36.0 |
|  | 1x | 3 | 0.5 | 2.5 |

*Treatment Rate: 1/2x = 8.0 fl. oz./cwt; 1x = 16 fl. oz./cwt

TABLE 3

Corn Seed Germination Data

| Solvent | Rate* | Control | 3 DAT | 7 DAT |
|---|---|---|---|---|
| UTC | — | 1 | 84.5 | 94.0 |
|  | — | 2 | 91.0 | 95.5 |
|  | — | 3 | 80.5 | 92.0 |
| Norpar ® 12 | 1/2x | 1 | 90.5 | 95.5 |
|  | 1x | 1 | 79.0 | 88.5 |
| Norpar ® 15 | 1/2x | 1 | 73.5 | 90.0 |
|  | 1x | 1 | 34.0 | 78.5 |
| Isopar ® G | 1/2x | 1 | 91.0 | 97.0 |
|  | 1x | 1 | 88.0 | 91.0 |
| Isopar ® L | 1/2x | 2 | 91.0 | 93.5 |
|  | 1x | 2 | 86.5 | 91.5 |
| Isopar ® M | 1/2x | 1 | 71.0 | 86.0 |
|  | 1x | 1 | 44.0 | 75.0 |
| Exxsol ® D80 | 1/2x | 2 | 90.0 | 93.0 |
|  | 1x | 2 | 72.0 | 85.5 |
| Exxsol ® D110 | 1/2x | 2 | 72.0 | 87.5 |
|  | 1x | 2 | 53.0 | 82.0 |
| Exxsol ® D130 | 1/2x | 2 | 75.5 | 90.5 |
|  | 1x | 2 | 36.5 | 76.0 |
| Aromatic 150 | 1/2x | 3 | 84.5 | 93.5 |
|  | 1x | 3 | 68.5 | 92.5 |
| Aromatic 200 | 1/2x | 3 | 13.0 | 31.5 |
|  | 1x | 3 | 1.0 | 4.0 |
| Exxate ® 700 | 1/2x | 3 | 83.0 | 92.5 |
|  | 1x | 3 | 76.0 | 89.5 |
| Exxate ® 1000 | 1/2x | 3 | 45.0 | 63.0 |
|  | 1x | 3 | 21.5 | 31.5 |

*Treatment Rate: 1/2x = 7.2 fl. oz./cwt; 1x = 14.4 fl. oz./cwt

TABLE 4

Cotton Seed Germination Data

| Solvent | Rate* | Control | 3 DAT | 7 DAT |
|---|---|---|---|---|
| UTC | — | 1 | 62.5 | 73.5 |
|  | — | 2 | 61.0 | 80.5 |
|  | — | 3 | 64.0 | 74.0 |
| Norpar ® 12 | 1/2x | 1 | 65.0 | 78.5 |
|  | 1x | 1 | 61.5 | 73.5 |
| Norpar ® 15 | 1/2x | 1 | 64.0 | 82.0 |
|  | 1x | 1 | 62.0 | 80.5 |
| Isopar ® G | 1/2x | 1 | 67.0 | 75.5 |
|  | 1x | 1 | 71.5 | 80.5 |
| Isopar ® L | 1/2x | 2 | 53.0 | 84.0 |
|  | 1x | 2 | 51.5 | 79.5 |
| Isopar ® M | 1/2x | 1 | 57.0 | 72.5 |
|  | 1x | 1 | 71.5 | 85.0 |
| Exxsol ® D80 | 1/2x | 2 | 60.0 | 77.5 |
|  | 1x | 2 | 43.0 | 71.5 |
| Exxsol ® D110 | 1/2x | 2 | 44.5 | 74.5 |
|  | 1x | 2 | 47.0 | 68.5 |
| Exxsol ® D130 | 1/2x | 2 | 49.0 | 80.5 |
|  | 1x | 2 | 43.0 | 78.0 |
| Aromatic 150 | 1/2x | 3 | 53.0 | 75.0 |
|  | 1x | 3 | 48.0 | 73.5 |
| Aromatic 200 | 1/2x | 3 | 44.0 | 75.5 |
|  | 1x | 3 | 43.0 | 79.0 |
| Exxate ® 700 | 1/2x | 3 | 52.5 | 78.0 |
|  | 1x | 3 | 14.5 | 66.0 |
| Exxate ® 1000 | 1/2x | 3 | 44.5 | 82.0 |
|  | 1x | 3 | 23.0 | 71.5 |

*Treatment Rate: 1/2x = 13.5 fl. oz./cwt; 1x = 27 fl. oz./cwt

TABLE 5

Soybean Seed Germination Data

| Solvent | Rate* | Control | 3 DAT | 7 DAT |
|---|---|---|---|---|
| UTC | — | 1 | 80.5 | 89.0 |
|  | — | 2 | 84.0 | 94.5 |
|  | — | 3 | 80.0 | 94.5 |
| Norpar ® 12 | 1/2x | 1 | 79.5 | 94.5 |
|  | 1x | 1 | 85.0 | 94.0 |
| Norpar ® 15 | 1/2x | 1 | 85.0 | 92.0 |
|  | 1x | 1 | 75.5 | 86.5 |
| Isopar ® G | 1/2x | 1 | 86.0 | 96.0 |
|  | 1x | 1 | 83.5 | 91.0 |
| Isopar ® L | 1/2x | 2 | 81.0 | 92.5 |
|  | 1x | 2 | 80.0 | 94.5 |
| Isopar ® M | 1/2x | 1 | 83.5 | 96.5 |
|  | 1x | 1 | 87.0 | 95.5 |
| Exxsol ® D80 | 1/2x | 2 | 83.0 | 95.0 |
|  | 1x | 2 | 86.5 | 94.0 |
| Exxsol ® D110 | 1/2x | 2 | 83.0 | 95.0 |
|  | 1x | 2 | 83.5 | 91.0 |
| Exxsol ® D130 | 1/2x | 2 | 86.5 | 96.0 |
|  | 1x | 2 | 82.0 | 93.0 |
| Aromatic 150 | 1/2x | 3 | 82.5 | 93.5 |
|  | 1x | 3 | 82.5 | 95.5 |
| Aromatic 200 | 1/2x | 3 | 78.0 | 92.0 |
|  | 1x | 3 | 79.5 | 93.0 |
| Exxate ® 700 | 1/2x | 3 | 80.0 | 93.0 |
|  | 1x | 3 | 83.5 | 92.5 |
| Exxate ® 1000 | 1/2x | 3 | 75.5 | 92.5 |
|  | 1x | 3 | 75.5 | 88.5b |

*Treatment Rate: 1/2x = 4.0 fl. oz./cwt; 1x = 8 fl. oz./cwt

Without wishing to be bound by theory, in general, the keys to solvent choice appear to be high volatility (to minimize contact time with the seed) and low treat rates (to minimize exposure). Preferred choices of acceptable fluids are:

Isopar®G,L>Exxate® 700>Aromatic 150>Norpar®12>Exxsol® D80.

The most preferred solvents are Isopar® G, and Isopar® L, Exxate® 700 and Aromatic 150 Solvents. Use of these solvents in particular can overcome many of the disadvantages cited above for water based treatments.

In addition, major differences were seen between monocots (corn, wheat) and dicots (cotton, soybean). Seed sensitivity to fluids follows the order below:

(least sensitive) soybean≦cotton<<corn<wheat (most sensitive)

For dicots, all fluids at all concentrations showed no significant decrease in germination rate or increase in phytotoxicity, except for the use of Exxate® fluids at higher concentrations on cotton. For monocots, the major impact of volatility is seen within all fluid types, with more volatile fluids preferred.

Accordingly, the present inventor has shown that selected fluids can be safely used in a seed treatment program with low or no phytotoxic effect on seeds. Such solvents may be used alone to contact seeds, or the solvents may be used to dissolve a seed treatment agent. In more preferred embodiments the solvent may be used in a coating process for seeds wherein the coating comprises a seed treatment agent, e.g., wherein the coating provides a beneficial effect, such as to allow for pesticide incorporation, for seed identification, or in a process wherein the seed is contacted with a composition comprising a seed treatment agent intended to be translocated across the seed coat into the seed.

Other preferred embodiments include a method of treating seeds comprising contacting seeds with a composition comprising a non-aqueous solvent and allowing said solvent to evaporate; and also more preferred variations wherein said composition further comprises at least one seed treatment agent; wherein said seed treatment agent is selected from active ingredients, inert ingredients, and mixtures thereof, wherein said composition further comprises a solute selected from the group consisting of fungicides, insecticides, growth hormones, and mixtures thereof, wherein the seeds are wetted and not soaked with said composition; wherein a coating consisting essentially of at least one seed treatment agent is left on the seeds; wherein said seed treatment agent is translocated into the seed; wherein said non-aqueous solvent is selected from hydrocarbons, oxygenated hydrocarbons, nitrogen-containing hydrocarbons, and mixtures thereof, wherein said non-aqueous solvent has a boiling point from 160 to 280° C., and is selected from the group consisting of normal paraffins, isoparaffins, dearomatized mixed aliphatic solvents, aromatic solvents, alkyl acetate esters, and mixtures thereof, wherein said solvent is selected from the group consisting of Isopar® G, Isopar® L, Exxate® 700, Exxate® 1000, and Aromatic 150; wherein the seeds are selected from the group consisting of corn, wheat, soybean, cotton, rice, and mixtures thereof, wherein the process further comprises: (a) preparing said composition as an emulsifiable concentrate; then (b) diluting said emulsifiable concentrate with water; then (c) contacting the seeds with said composition; then (d) allowing said composition to evaporate; wherein the seeds are wetted but not soaked by said composition to provide a coating of said seed treatment agent in an effective amount, and more particularly wherein said wetting does not substantially effect the germination of said seed; and a seed treatment including coating a seed with a seed treatment agent, wherein said seed treatment agent is used for at least one of aiding in the identification of the seed, increasing the germination rate of the seed, improving the delivery of the seeds to the field, and increasing the viability of the seeds and/or resultant plant in the feed, the improvement comprising contacting said seed with a composition including said seed treatment agent and a non-aqueous solvent and, after said contacting, allowing said non-aqueous solvent to evaporate; and also more preferred embodiments wherein: the seed is wetted and not soaked by said non-aqueous solvent; wherein said seed treatment agent is selected from the group consisting of fungicides, insecticides, growth hormones, and mixtures thereof; wherein said non-aqueous solvent is selected from the group consisting of normal paraffins, isoparaffins, dearomatized mixed aliphatic solvents, aromatic solvents, alkyl acetate esters, and mixtures thereof; or wherein the method further comprises the steps of: (a) preparing said composition comprising at least one non-aqueous solvent and at least one seed treatment agent as an emulsifiable concentrate further including an emulsifier; then (b) diluting said emulsifiable concentrate with water; then (c) contacting the seeds with said composition; then (d) allowing said composition to evaporate;

and also a more preferred embodiment which is an emulsifiable concentrate comprising a non-aqueous solvent, a seed treatment agent, and an emulsifier.

It will be appreciated by one of ordinary skill in the art in possession of the present disclosure that many variations of the aforementioned may be practiced within the spirit of the appended claims.

I claim:

1. A method of treating seeds consisting essentially of contacting seeds with a composition consisting essentially of a non-aqueous solvent and of allowing said solvent to evaporate.

2. A method of treating seeds consisting essentially of:
   a) contacting said seeds with a composition consisting essentially of
      1) a non-aqueous solvent selected from the group consisting of hydrocarbons, oxygenated hydrocarbons, nitrogen-containing hydrocarbons and mixtures thereof, wherein said solvent has a boiling point between 160° C. and 280° C.; and
      2) at least one seed treatment agent, wherein said seed treatment agent is selected from the group consisting of fungicides, insecticides, growth hormones, and mixtures thereof; and
   b) allowing the solvent to evaporate.

3. The method according to claim 1, wherein the seeds are wetted and not soaked with said composition.

4. The method according to claim 2, wherein the seeds are wetted and not soaked with said composition.

5. The method according to claim 4, wherein at least one said seed treatment agent is left on the seeds.

6. The method according to claim 2, wherein said seed treatment agent is translocated into the seed.

7. The method according to claim 1, wherein said non-aqueous solvent is selected from hydrocarbons, oxygenated hydrocarbons, nitrogen-containing hydrocarbons, and mixtures thereof.

8. The method according to claim 1, wherein said non-aqueous solvent has a boiling point from 160 to 280° C., and is selected from the group consisting of normal paraffins, isoparaffins, dearomatized mixed aliphatic solvents, aromatic solvents, alkyl acetate esters, and mixtures thereof.

9. The method according to claim 8, wherein said solvent is selected from the group consisting of a C9–C11 isoparaffin mixture having a boiling point range of 161° C. to 176° C., a C11–C12 isoparaffin mixture having a boiling point range of 188° C. to 207° C., an acetate ester mixture having a boiling point range of 176° C. to 200° C. and an alcohol portion having an average carbon number ranging from 6 to 8, an acetate mixture having a boiling point range of 220° C. to 250° C. and an alcohol portion having an average carbon number ranging from 9 to 11, and a C9–C11 aromatic mixture having a boiling point range of 184° C to 200° C.

10. The method according to claim 1, wherein the seeds are selected from the group consisting of corn, wheat, soybean, cotton, rice, and mixtures thereof.

11. A method of treating seeds consisting essentially of:
    a) preparing an emulsifiable concentrate consisting essentially of
       1) a non-aqueous solvent selected from the group consisting of hydrocarbons, oxygenated hydrocarbons, nitrogen-containing hydrocarbons and mixtures thereof, wherein said solvent has a boiling point between 160° C. and 280° C.; and
       2) at least one seed treatment agent, wherein said seed treatment agent is selected from the group consisting of fungicides, insecticides, growth hormones, and mixtures thereof; and
       3) an emulsifier; and
    b) diluting said concentrate with water to form a diluted composition;
    c) contacting said seeds with said diluted composition; and
    d) allowing the solvent to evaporate.

12. The method according to claim 11, wherein the seeds are wetted but not soaked by said composition to provide a coating of said seed treatment agent in an effective amount.

13. A method of seed treatment consisting essentially of coating a seed with a seed treatment agent, wherein said seed treatment agent is used for at least one of aiding in the identification of the seed, increasing the germination rate of the seed, improving the delivery of the seeds to the field, and increasing the viability of the seeds and/or resultant plant in the feed, the improvement consisting essentially of contacting said seed with a composition consisting essentially of said seed treatment agent wherein said seed treatment agent is selected from the group consisting of fungicides, insecticides, growth hormones, and mixtures thereof and a non-aqueous solvent selected from the group consisting of hydrocarbons, oxygenated hydrocarbons, nitrogen-containing hydrocarbons and mixtures thereof, wherein said solvent has a boiling point between 160° C. and 280° C. and, after said contacting, allowing said non-aqueous solvent to evaporate.

14. The method according to claim 13, wherein the seed is wetted and not soaked by said non-aqueous solvent.

15. The method according to claim 13, wherein said non-aqueous solvent is selected from the group consisting of normal paraffins, isoparaffins, dearomatized mixed aliphatic solvents, aromatic solvents, alkyl acetate esters, and mixtures thereof.

16. A method of seed treatment consisting essentially of coating a seed with a seed treatment agent, wherein said seed treatment agent is used for at least one of aiding in the identification of the seed, increasing the germination rate of the seed, improving the delivery of the seeds to the field, and increasing the viability of the seeds and/or resultant plant in the feed, the improvement consisting essentially of (a) preparing a composition as an emulsifiable concentrate consisting essentially of at least one non-aqueous solvent selected from the group consisting of hydrocarbons, oxygenated hydrocarbons, nitrogen-containing hydrocarbons and mixtures thereof, wherein said solvent has a boiling point between 160° C. and 280° C., at least one seed treatment agent and an emulsifier;

(b) diluting said emulsifiable concentrate with water;

(c) contacting the seeds with said composition; and (d) allowing said non-aqueous solvent and said water to evaporate.

17. An emulsifiable concentrate consisting essentially of a non-aqueous solvent, a seed treatment agent, wherein said seed treatment agent is selected from the group consisting of fungicides, insecticides, growth hormones, and mixtures thereof, and an emulsifier, wherein said non-aqueous solvent is selected from the group consisting of hydrocarbons, oxygenated hydrocarbons, nitrogen-containing hydrocarbons and mixtures thereof and further wherein said non-aqueous solvent has a boiling point between 160° C. and 280° C.

* * * * *